US006092044A

United States Patent [19]

Baker et al.

[11] Patent Number: 6,092,044

[45] Date of Patent: Jul. 18, 2000

[54] PRONUNCIATION GENERATION IN SPEECH RECOGNITION

[75] Inventors: James K. Baker, West Newton; Gregory J. Gadbois, Amesbury; Charles E. Ingold, Bedford; Joel W. Parke, Marlborough; Stijn Van Even, Jamaica Plain, all of Mass.

[73] Assignee: Dragon Systems, Inc., Newton, Mass.

[21] Appl. No.: 08/825,141

[22] Filed: Mar. 28, 1997

[51] Int. Cl.[7] .................................................. G10L 15/08

[52] U.S. Cl. ........................................................... 704/254

[58] Field of Search .................................... 704/231, 251, 704/257

[56] References Cited

U.S. PATENT DOCUMENTS

| | | | |
|---|---|---|---|
| 4,481,593 | 11/1984 | Bahler | 364/513.5 |
| 4,489,435 | 12/1984 | Moshier | 381/43 |
| 4,718,094 | 1/1988 | Bahl et al. | 381/43 |
| 4,783,803 | 11/1988 | Baker et al. . | |
| 4,805,218 | 2/1989 | Bamberg et al. . | |
| 4,805,219 | 2/1989 | Baker et al. . | |
| 4,829,576 | 5/1989 | Porter . | |
| 4,833,712 | 5/1989 | Bahl et al. . | |
| 5,027,406 | 6/1991 | Roberts et al. | 381/43 |
| 5,208,897 | 5/1993 | Hutchins | 395/2 |
| 5,222,188 | 6/1993 | Hutchins | 395/2 |
| 5,293,451 | 3/1994 | Brown et al. | 395/2.54 |
| 5,329,609 | 7/1994 | Sanada et al. | 395/2.6 |
| 5,428,707 | 6/1995 | Gould et al. . | |
| 5,440,663 | 8/1995 | Moese et al. . | |
| 5,497,447 | 3/1996 | Bahl et al. | 295/2.54 |
| 5,500,920 | 3/1996 | Kupiec | 395/2.79 |
| 5,623,578 | 4/1997 | Mikkilineni . | |
| 5,652,828 | 7/1997 | Silverman | 395/2.69 |
| 5,748,840 | 5/1998 | La Rue | 395/2.63 |
| 5,751,906 | 5/1998 | Silverman | 395/2.69 |
| 5,765,132 | 6/1998 | Roberts | 704/254 |
| 5,794,189 | 8/1998 | Gould | 704/231 |
| 5,815,639 | 9/1998 | Bennett et al. | 395/2.44 |
| 5,850,627 | 12/1998 | Gould et al. | 704/231 |

FOREIGN PATENT DOCUMENTS 0 562 138 A1 9/1993 European Pat. Off. .

OTHER PUBLICATIONS

Kita, Kenji et al., "Processing Unknown Words in Continuous Speech Recognition," IEICE Trans., vol. E74, No. 7 (Jul. 1991), pp. 1811–1815.

Asadi, et al.; "Automatic Modeling for Adding New Words to a Large–Vocabulary Continuous Speech Recognition System"; ICASSP 91 vol. 1; International Conference; pp. 305–308.

Bahl, et al.; "A Maximum Likelihood Approach to Continuous Speech Recognition"; IEEE Transactions on Pattern Analysis and Machine Intelligence, vol. PAMI–5; No. 2, Mar. 1983.

European Search Report dated Apr. 7, 1999.

Asadi, Ayman, "Automatic Modeling for Adding New Words to a Large Vocabulary . . . ", ICASSP 91, vol. 1, pp. 305–308, 1991.

(List continued on next page.)

*Primary Examiner*—Krista Zele
*Assistant Examiner*—Michael N. Opsasnick
*Attorney, Agent, or Firm*—Fish & Richardson P.C.

[57] ABSTRACT

A method of adding a word to a speech recognition vocabulary includes creating a collection of possible phonetic pronunciations from a spelling of the word and using speech recognition to find a pronunciation from the collection that best matches an utterance of the word. The collection is created by comparing the spelling to a rules list of letter strings with associated phonemes. The list is searched for a letter string from the spelling of length greater than one letter. The collection is limited to phonetic pronunciations containing phonemes associated with the letter string of length greater than one. In another method, a net of possible phonetic pronunciations of the word is created from the spelling and speech recognition is used to find the pronunciation from the net that best matches the utterance of the word. The invention also features methods of assigning a pre-filtering class to a word.

14 Claims, 16 Drawing Sheets

OTHER PUBLICATIONS

Bahl, Lalit, "A Maximum LikeLihood Approach to Continuous Speech Recognition", IEEE Transactions on Patern Analysis and Machine Intelligence, vol. PAMI–5, No. 2, pp. 179–190, Mar. 1983.

Bahl, L.R., "Automatic High–Resolution Labeling of Speech Waveforms", IBM Technical Disclosure Bulletin, vol. 23, No. 7B, pp. 3466–3467, Dec. 1980.

Bahl, L.R., "Automatic Phonetic Baseform Determination", ICASSP 91, vol. 1, pp. 173–176, May 1991.

Bahl, L.R., "Adaptation of Large Vocabulary Recognition System" ICASSP–92, vol. 1, pp. I477–480 Mar. 1992.

Bahl, L.R., "Automatic Selection of Speech Prototypes " IBM Technical Disclosure Bulletin vol. 24, No. 4, pp. 2042–2043, Sep. 1981.

Bahl, L.R., "Interpolation of Estimators Derived From Sparse Data", IBM Technical Disclosure Bulletin vol. 24, No. 4, pp. 2038–2041, Sep. 1981.

Das, S.K., "System for Temporal Registration of Quasi–Phonemic Utterance Representations", IBM Technical Disclosure Bulletin, Bol. 23, No. 7A, pp. 3047–3050, Dec. 1980.

Haeb–Unbach, R., "Automatic Transcription of Unknown Words in a Speech Recognition System", The 1995 International Conference on Acoustice, Speech, and Signal Processing, vol. 1, pp. 840–843, May 1995.

Hunnicutt, Sheri, "Reversible Letter–to–Sound Sound–to–Letter Generation . . . ", Eurospeech '93, vol. 2, pp. 763–766.

Imai, Toru, "ANew Method for Automatic Generation of Speaker–Dependent Phonological Rules", The 1995 International Conference on Acoustice, Speech, and Signal Processing, vol. 1, pp. 864–867, May 1995.

Merialdo B., "Multilevel decoding for Very–Large–Size–Dictionary speech recognition", IBM J. Res. Develop., vol. 32, No. 2, Mar. 1988.

Wothke, K., "Morphologically based automatic phonetic transcription", IBM Systems Journal, vol. 32, No. 3, 1993.

| | Frame | 840 ("A") | 805 ("B") | 810 ("C") | 815 ("D") | Next Node ("N") |
|---|---|---|---|---|---|---|
| 900 | 0 | 0 | ----- | ----- | ----- | ----- |
| 905 | 1 | $S_{A1}=A_{A1}$ | $S_{B1}=A_{B1}$ | ----- | ----- | ----- |
| 910 | 2 | $S_{A2}=S_{A1}+A_{A2}$ | $S_{B2}=\min(S_{B1}+stay_B, S_{A1})+A_{B2}$ | $S_{C2}=S_{B1}+leave_B+A_{C2}$ | ----- | ----- |
| 915 | 3 | $S_{A3}=S_{A2}+A_{A3}$ | $S_{B3}=\min(S_{B2}+stay_B, S_{A2})+A_{B3}$ | $S_{C3}=\min(S_{C2}+stay_C, S_{B2}+leave_B)+A_{C3}$ | $S_{D3}=S_{C2}+leave_C+A_{D3}$ | ----- |
| 920 | 4 | $S_{A4}=S_{A3}+A_{A4}$ | $S_{B4}=\min(S_{B3}+stay_B, S_{A3})+A_{B4}$ | $S_{C4}=\min(S_{C3}+stay_C, S_{B3}+leave_B)+A_{C4}$ | $S_{D4}=\min(S_{D3}+stay_D, S_{c3}+leave_C)+A_{D4}$ | $S_{N4}=S_{D2}+leave_D+A_{D4}$ |
| 925 | n | $S_{An}=S_{An-1}+A_{An}$ | $S_{Bn}=\min(S_{Bn-1}+stay_B, S_{An-1})+A_{Bn}$ | $S_{Cn}=\min(S_{Cn-1}+stay_C, S_{Bn-1}+leave_B)+A_{Cn}$ | $S_{Dn}=\min(S_{Dn-1}+stay_D, +S_{cn-1}+leave_C)+A_{Dn}$ | $S_{NN}=\min(S_{Nn-1}+stay_M, S_{Mn-1}+leave_M)+A_{Nm}$ |

FIG. 9

| | Frame | 810 ("A") | 805 ("B") | 810 ("C") | 815 ("D") | Next Node ("N") |
|---|---|---|---|---|---|---|
| 900 | 0 | $S_{AO}=0$ | ----- | ----- | ----- | ----- |
| 905 | 1 | $S_{A1}=f(S_{AO}, A_{A1})$ | $S_{B1}=f(S_{AO}, A_{B1})$ | ----- | ----- | ----- |
| 910 | 2 | $S_{A2}=f(S_{A1}, A_{A2})$ | $S_{B2}=f(S_{B1}, stay_B, S_{A1}, A_{B2})$ | $S_{C2}=f(S_{B1}, leave_B, A_{C2})$ | ----- | ----- |
| 915 | 3 | $S_{A3}=f(S_{A2}, A_{A3})$ | $S_{B3}=f(S_{B2}, stay_B, S_{A2}, A_{B3})$ | $S_{C3}=f(S_{C2}, stay_C, S_{B2}, leave_B, A_{C3})$ | $S_{D3}=f(S_{C2}, leave_C, A_{D3})$ | ----- |
| 920 | 4 | $S_{A4}=f(S_{A3}, A_{A4})$ | $S_{B4}=f(S_{B3}, stay_B, S_{A3}, A_{B4})$ | $S_{C4}=f(S_{C3}, stay_C, S_{B3}, leave_B, A_{C4})$ | $S_{D4}=f(S_{D3}, stay_D, S_{c3}, leave_C, A_{D4})$ | $S_{N4}=f(S_{D3}, leave_D, A_{D3})$ |
| 925 | n | $S_{An}=f(S_{An-1}, A_{An})$ | $S_{Bn}=f(S_{Bn-1}, stay_B, S_{An-1}, A_{Bn})$ | $S_{Cn}=f(S_{Cn-1}, stay_C, S_{Bn-1}, leave_B, A_{Cn})$ | $S_{Dn}=f(S_{Dn-1}, stay_D, S_{cn-1}, leave_C, A_{Dn})$ | $S_{Nn}=f(S_{Dn-1}, leave_N, A_{Nn})$ |

FIG. 10

| | |
|---|---|
| " | "aw" |
| ! | "a" |
| $ | "ey" |
| & | "ah" |
| ) | "AH" |
| * | "ae" |
| , | "AE" |
| / | "ee" |
| 6 | "i" |
| 8 | "ie" |
| : | "oy" |
| < | "OY" |
| = | "ow" |
| ? | "OW" |
| @ | "uh" |
| A | "EY" |
| C | "C" |
| D | "x" |
| E | "EI" |
| F | "ue" |
| H | "oo" |
| I | "IE" |
| L | "ul" |
| N | "ng" |
| O | "OH" |
| P | "ur" |
| S | "sh" |
| T | "th" |
| U | "UE" |
| V | "UR" |
| Z | "zh" |
| [ | "o" |
| ] | "oh" |
| a | "A" |
| b | "b" |
| c | "e" |
| d | "d" |
| e | "E" |
| f | "f" |
| g | "g" |
| h | "h" |
| i | "I" |
| j | "j" |
| k | "k" |
| l | "l" |
| m | "m" |
| n | "n" |
| o | "o" |
| p | "p" |
| q | "oo" |
| r | "r" |
| s | "s" |
| t | "t" |
| u | "UH" |
| v | "v" |
| w | "w" |
| y | "y" |
| z | "z" |
| ( | "AW" |
| ) | "um" |
| - | "un" |

FIG. 20

PRONUNCIATION GENERATION IN SPEECH RECOGNITION

BACKGROUND

The invention relates to generating pronunciations for words added to a dictation vocabulary used in a speech recognition system.

A speech recognition system analyzes a person's speech to determine what the person said. Most speech recognition systems are frame-based. In a frame-based system, a processor divides a signal descriptive of the speech to be recognized into a series of digital frames, each of which corresponds to a small time increment of the speech. The processor then compares the digital frames to a set of speech models. Each speech model may represent a word from a vocabulary of words, and may represent how that word is spoken by a variety of speakers. A speech model also may represent a sound, or phoneme, that corresponds to a portion of a word. Collectively, the constituent phonemes for a word represent the phonetic spelling of the word.

The processor determines what the speaker said by finding the speech models that best match the digital frames that represent the person's speech. The words or phrases corresponding to the best matching speech models are referred to as recognition candidates. The processor may produce a single recognition candidate for each utterance, or may produce a list of recognition candidates. Speech recognition is discussed in U.S. Pat. No. 4,805,218, entitled "METHOD FOR SPEECH ANALYSIS AND SPEECH RECOGNITION," which is incorporated by reference.

A speech recognition system may be a "discrete" system—i.e., one which recognizes discrete words or phrases but which requires the speaker to pause briefly between each discrete word or phrase. Alternatively, a speech recognition system may be "continuous" meaning that the recognition software can recognize spoken words or phrases regardless of whether the speaker pauses between them. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

SUMMARY

In one aspect, the invention features adding a word to a speech recognition vocabulary. A spelling and an utterance of the word are received a collection of possible phonetic pronunciations of the word are created. Speech recognition techniques are then used to find a pronunciation from the collection that best matches the utterance of the word. The word is then added to the speech recognition vocabulary using the spelling and the best-matching pronunciation.

The collection of possible phonetic pronunciations of the word is created by comparing the spelling of the word to a rules list of letter strings with associated phonemes. The letter strings of the rules list are searched for a letter string from the spelling of length greater than one letter. The collection of possible phonetic pronunciations is limited to phonetic pronunciations containing phonemes associated with the letter string of length greater than one.

Implementations may further include the following features. The letter strings of the rules list may be searched for a longest length letter string from the spelling. The collection of possible phonetic pronunciations may be limited to phonetic pronunciations containing phonemes associated with the letter string of longest length.

The comparing may start with letter strings from the spelling beginning with a first letter of the spelling. The letter strings of the rules list may be searched for an initial longest length letter string from the spelling beginning with the first letter, and then may be searched for a subsequent longest length letter string from the spelling beginning with a letter following the last letter in the initial longest length letter string.

In another aspect, the invention features adding a word to a speech recognition vocabulary by receiving a spelling and an utterance of the word, and creating a net of possible phonetic pronunciations of the word by comparing the spelling to a rules list of letter strings with associated phonemes. Speech recognition is used to find a pronunciation from the net that best matches the utterance of the word. The word then is added to the speech recognition vocabulary using the spelling and the best-matching pronunciation.

In another aspect, the invention features assigning a pre-filtering class to a word by matching the first two letters of the word to classified words starting with the same two letters to form a sub-list of classified words. Phonemes of the word are matched to phonemes of the classified words in the sub-list to form a class list. The word then is placed in the class list.

Implementations may further include the following features. Phonemes of the word may be matched to phonemes of the classified words by matching the first four phonemes of the word to the first four phonemes of the classified words.

In another aspect, the invention features assigning a pre-filtering class to a word by performing a direct look-up of a first phoneme of the word in a database of classified words organized alphabetically by their phonemes, matching the first phoneme of the word to a first word in the database having the same first phoneme, selecting the first word in the database having the same first phoneme and a large number (e.g., 199) following words in the database to form a sub-list, matching the first phoneme of the word to the first phoneme of the classified words in the sub-list to form a class list, and placing the word in the class list.

Implementations may further include the following features. The first phoneme of the word may be matched to a first word in the database having the same first phoneme by matching the first four phonemes of the word to a first word in the database having the same first four phonemes. The first word in the database having the same first four phonemes may be selected. The first phoneme of the word may be matched to the first phoneme of the classified words in the sub-list by matching the first four phonemes of the word to the first four phonemes of the classified words in the sub-list.

Other features and advantages will become apparent from the following description, including the drawings, and from the claims.

BRIEF DESCRIPTION OF THE DRAWINGS

FIGS. 9 and 10 are charts of scores corresponding to the states of the state graphs of FIGS. 8A, 82 and 8C.

FIG. 20 is a table relating phoneme symbols to human pronunciations.

DESCRIPTION

Figure 1:
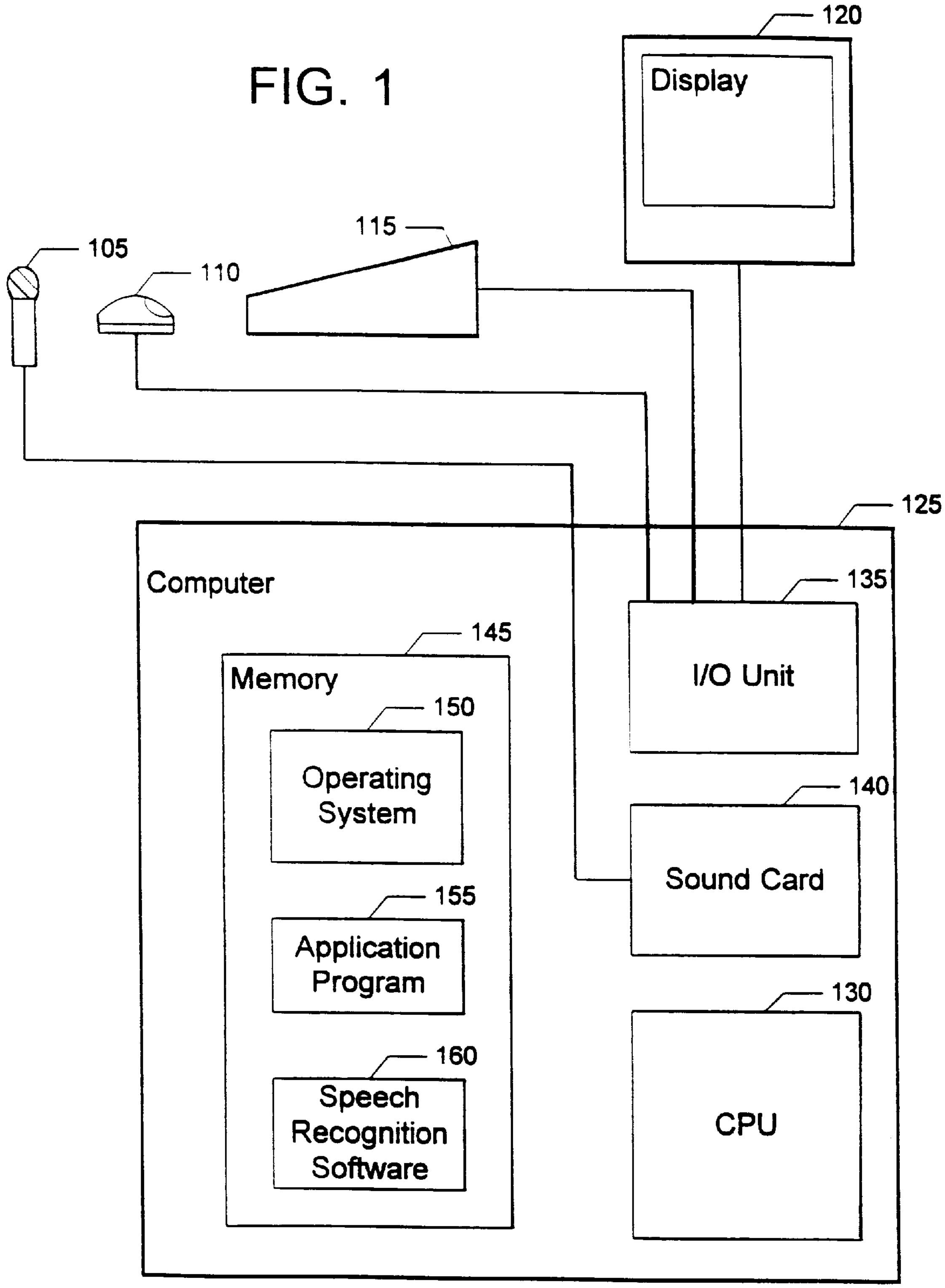
FIG. 1 is a block diagram of a speech recognition system.

FIG. 1 is a block diagram of a speech recognition system 100. The system includes input/output (I/O) devices (e.g., microphone 105, mouse 110, keyboard 115, and display 120) and a general purpose computer 125 having a processor 130, an I/O unit 135 and a sound card 140. A memory 145 stores data and programs such as an operating system 150, an application program 155 (e.g., a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's continuous speech. Utterances are separated from one another by a pause having a sufficiently-large, predetermined duration (e.g., 160–250 milliseconds). Each utterance may include one or more words of the user's speech.

Figure 2:
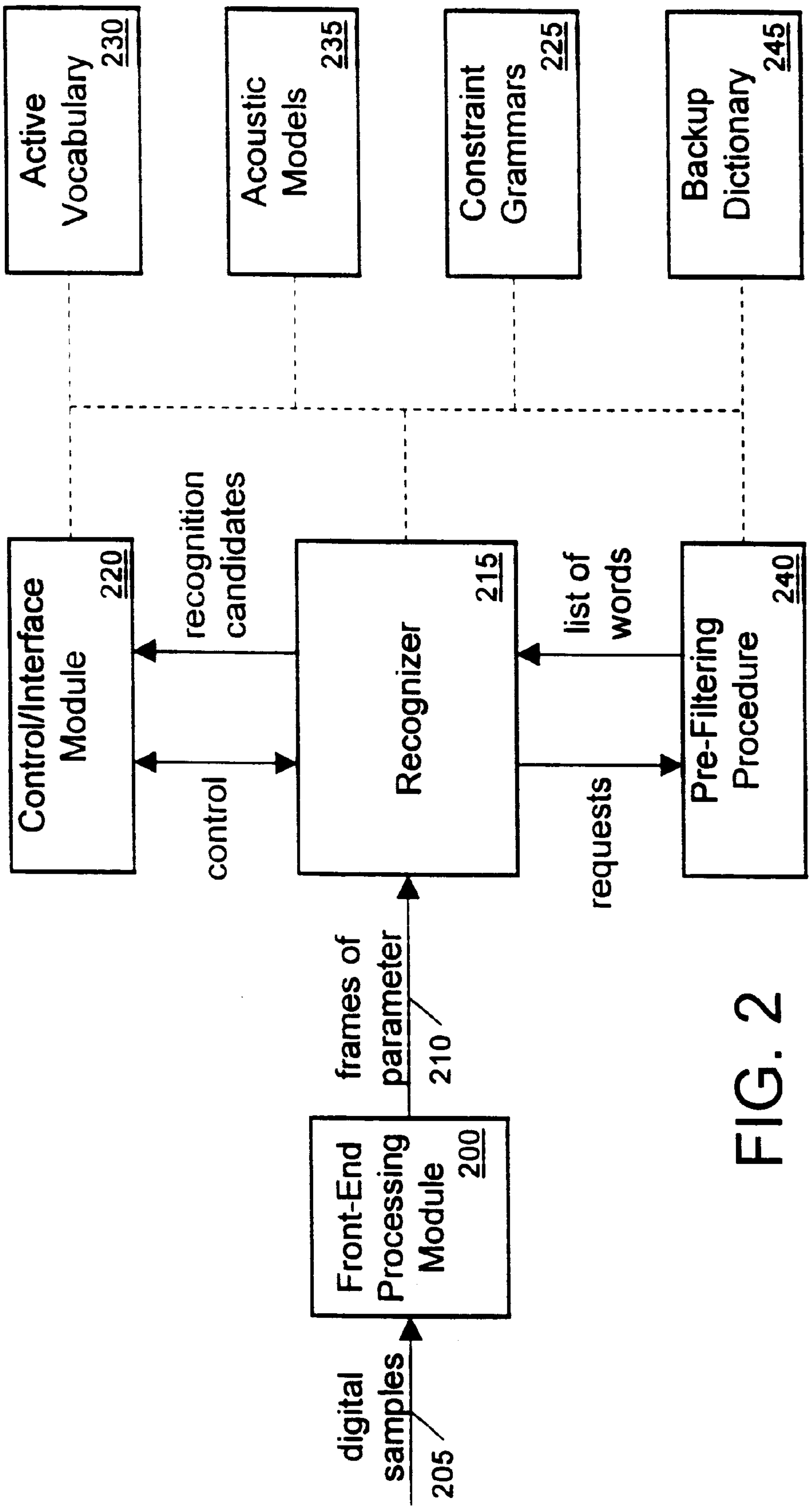
FIG. 2 is a block diagram of speech recognition software of the system of FIG. 1.

FIG. 2 illustrates components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 into frames of parameters 210 that represent the frequency content of an utterance. Each frame includes 24 parameters and represents a short portion (e.g., 10 milliseconds) of the utterance.

Figure 3:
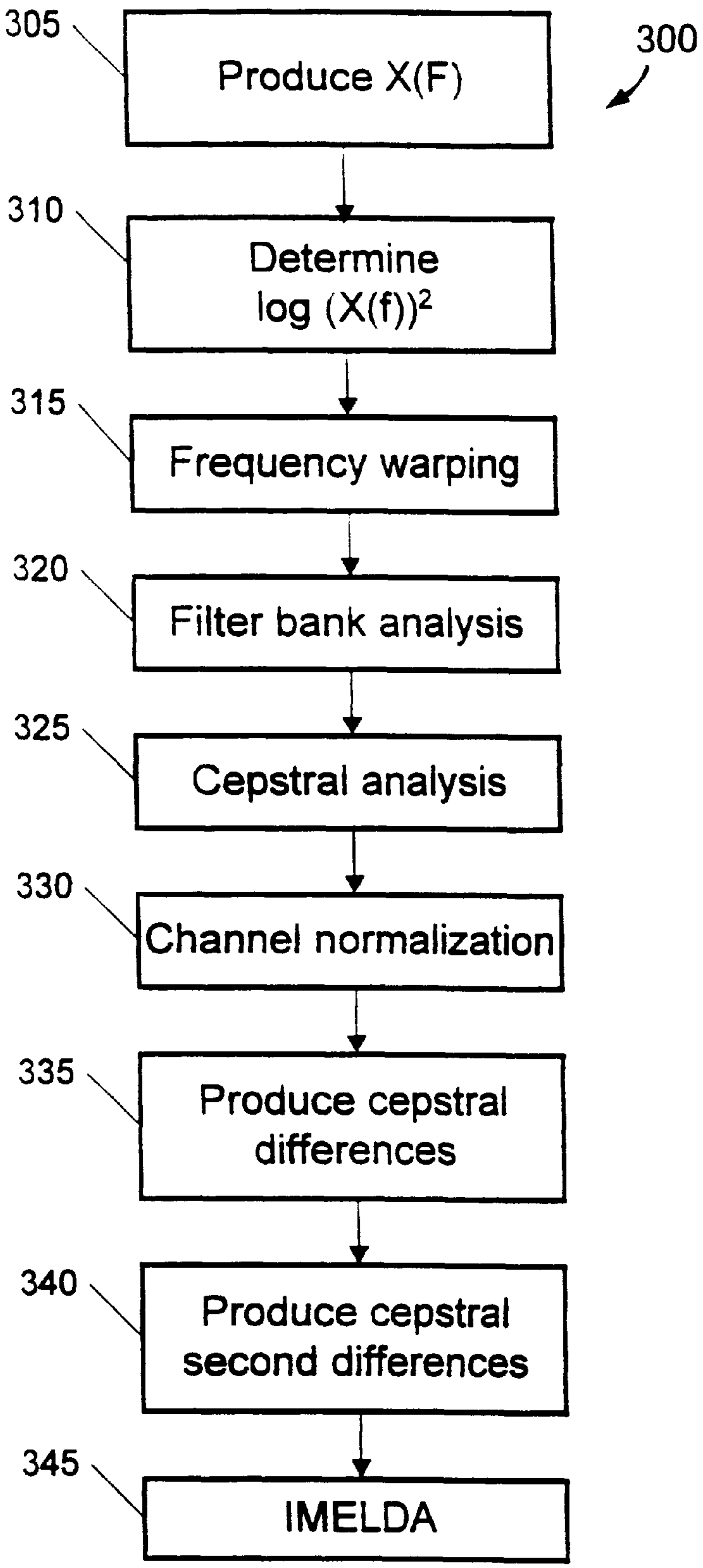
FIG. 3 is a flow chart of a signal processing procedure performed by the software of FIG. 2.

As shown in FIG. 3, the front end processing module 200 produces a frame from digital samples according to a procedure 300. The module first produces a frequency domain representation X(f) of the portion of the utterance by performing a Fast Fourier Transform (FFT) on the digital samples (step 305). Next, the module determines $\log(X(f))^2$ (step 310). The module then performs frequency warping (step 315) and a filter bank analysis (step 320) to achieve speaker normalization. See S. Wegmann et al., "Speaker Normalization on Conversational Speech," *Proc.* 1996 *ICASSP*, pp. I.339–I.341, which is incorporated by reference.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences have been found to emphasize information important to speech recognition more effectively than do the frequency parameters. After performing channel normalization of the cepstral parameters (step 330), the module produces twelve cepstral differences (i.e., the differences between cepstral parameters in successive frames) (step 335) and twelve cepstral second differences (i.e., the differences between cepstral differences in successive frames) (step 340). Finally, the module performs an IMELDA linear combination transformation to select the twenty four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases or sentences.

The recognizer 215 processes the frames 210 of an utterance in view of one or more constraint grammars 225. A constraint grammar, which also may be referred to as a template or restriction rule, may be a limitation on the words that may correspond to an utterance, a limitation on the order or grammatical form of the words, or both. For example, a constraint grammar for menu-manipulation commands may include only entries from the menu (e.g., "file", "edit") or command words for navigating through the menu (e.g., "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 4A:
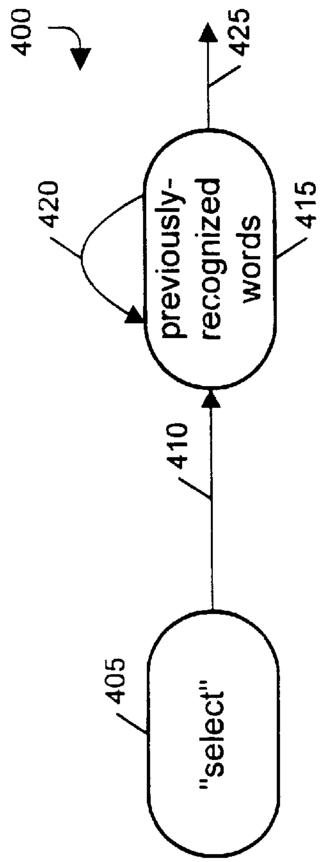
FIGS. 4A and 4B are state diagrams of a constraint grammar.
Figure 4B:
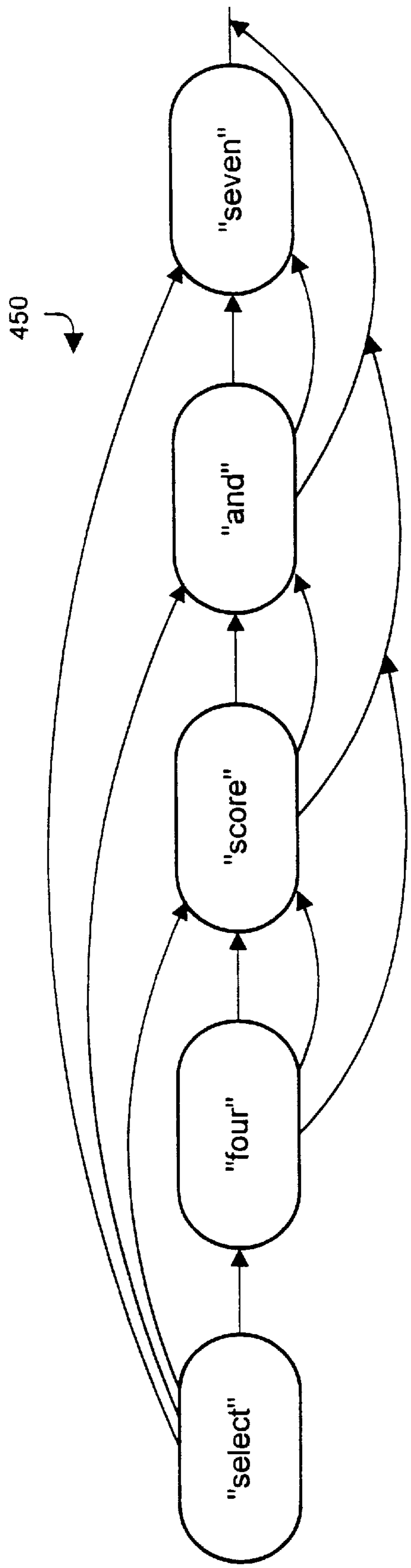

As shown in FIG. 4A, which illustrates the constraint grammar for a "select" command used to select previously recognized text, a constraint grammar may be illustrated as a state diagram 400. The "select" command includes the word "select" followed by one more previously-recognized words, with the words being in the order recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances.

The constraint grammar also may be expressed in Backus-Naur Form (BNF) or Extended BNF (EBNF). In EBNF, the grammar for the "select" command is:

<recognition result> ::= <"select"><word>,
where
<word> ::= <[PRW$^{1}$[PRW$^{2}$[PWR3.. PRW$^{n}$]]] ¦
[PRW$^{2}$[PWR3.. PRW$^{n}$]] ¦ .. PRW$^{n}$>
and
PRW ::= <previously-recognized word>.

As illustrated in FIGS. 4A and 4B, this notation indicates that "select" may be followed by any ordered sequence of previously-recognized words. Constraint grammars are discussed further in U.S. patent application Ser. No. 08/559,207, filed Nov. 13, 1995 and entitled "CONTINUOUS RECOGNITION OF SPEECH AND COMMANDS", which is incorporated by reference.

One constraint grammar 225 that may be used by the speech recognition software 160 is a large vocabulary dictation grammar. The large vocabulary dictation grammar identifies words included in the active vocabulary 230, which is the vocabulary of words known to the software. The large vocabulary dictation grammar also indicates the frequency with which words occur. The large vocabulary dictation grammar may include a language model. The language model may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition. Other constraint grammars 225 include an in-line dictation macros grammar for dictation commands, such as "/CAP" to capitalize a word and "/New-Paragraph" to start a new paragraph; a select X Y Z grammar used in selecting text, an error correction commands grammar; a dictation editing grammar, an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

The active vocabulary 230 uses a pronunciation model in which each word is represented by a series of phonemes that comprise the phonetic spelling of the word. In particular, each phoneme is represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations and language model information for the user. Dictation and command grammars may be split between vocabulary files to optimize language model information and memory use, and to keep each single vocabulary file under 64K words. There also is a set of system vocabularies.

Each dictation topic (e.g., "medical" or "legal") has its own vocabulary file. This allows the active dictation vocabulary to grow almost as large as 64 thousand words, and allows each dictation topic to have its own language model A dictation topic will consists of a set of words which represent the active vocabulary. There are around 30,000 words in each topic. This represents the words which are considered for normal recognition.

Separate acoustic models 235 are provided for each user of the system. Initially speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent each triphone node as a mixture of Gaussian probability density functions ("PDFS"). For example, node "i" of a triphone "abc" may be represented as $ab^ic$:

$$ab^ic = \sum_k w_k N(\mu_k, c_k),$$

where each $w_k$ is a mixture weight, $$\sum_k w_k = 1,$$

$\mu_k$ is a mean vector for the probability density function ("PDF" ) $N_k$, and $c_k$ is the covariance matrix for the PDF $N_k$. Like the frames in the sequence of frames, the vectors $\mu_k$ each include 24 parameters. The matrices $c_k$ are twenty four by twenty four matrices. Each triphone node may be represented as a mixture of up to sixteen different PDFS.

A particular PDF may be used in the representation of multiple triphone nodes. Accordingly, the acoustic models represent each triphone node as a collection of mixture weights $w_k$ associated with up to sixteen different PDFs $N_k$ and separately represent each PDF $N_K$ using a mean vector $\mu_k$ and a covariance matrix $c_k$.

The recognizer 215 operates in parallel with a pre-filtering procedure 240. Upon initiating processing of an utterance, the recognizer requests from the pre-filtering procedure a list of words that may have been spoken as the first word of the utterance (i.e., words that may correspond to the first and subsequent frames of the utterance). The pre-filtering procedure performs a coarse comparison of the sequence of frames with the active vocabulary 230 to identify a subset of the vocabulary for which a more extensive comparison using the recognizer is justified.

Figure 5:
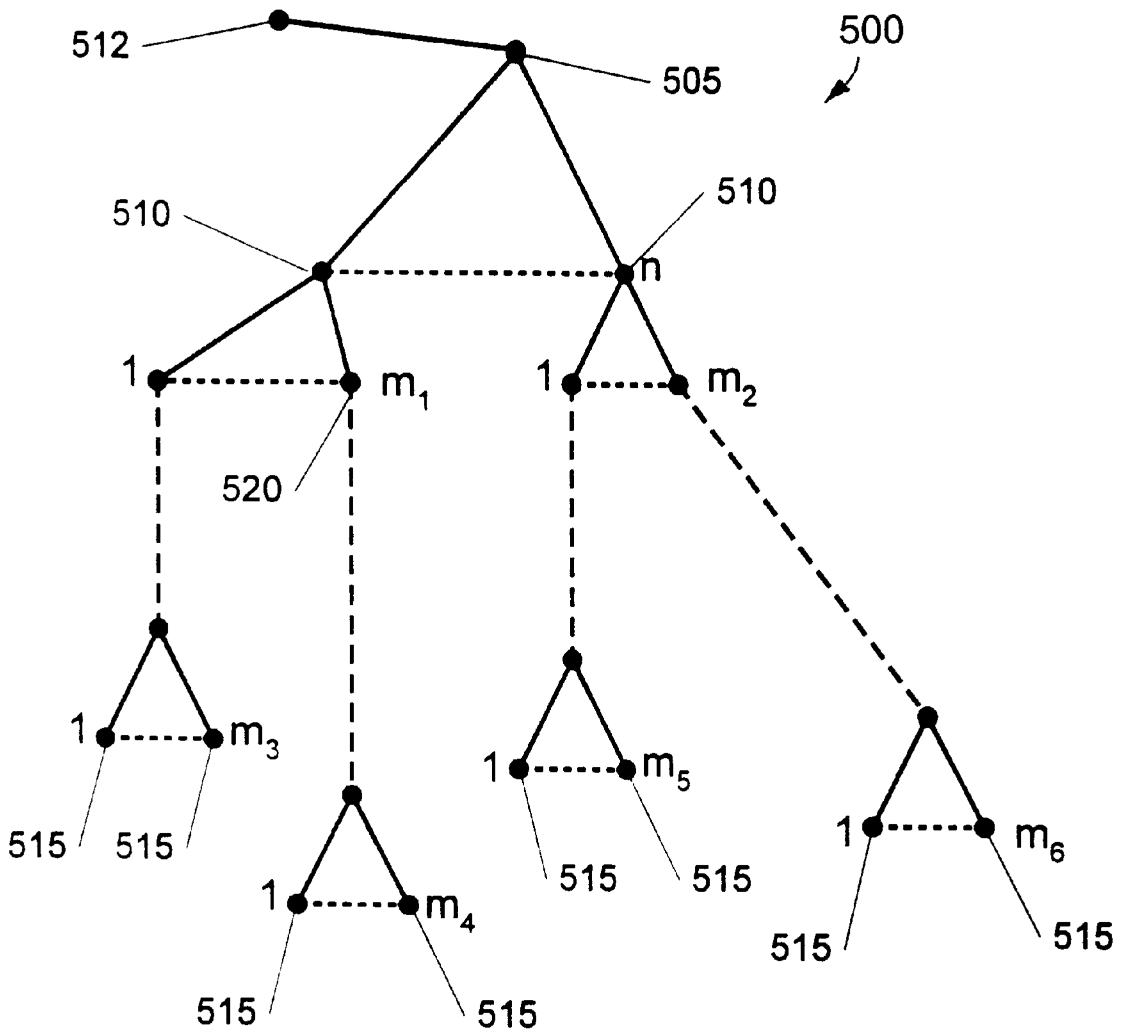
FIG. 5 is a graph of a lexical tree.
Figure 6:
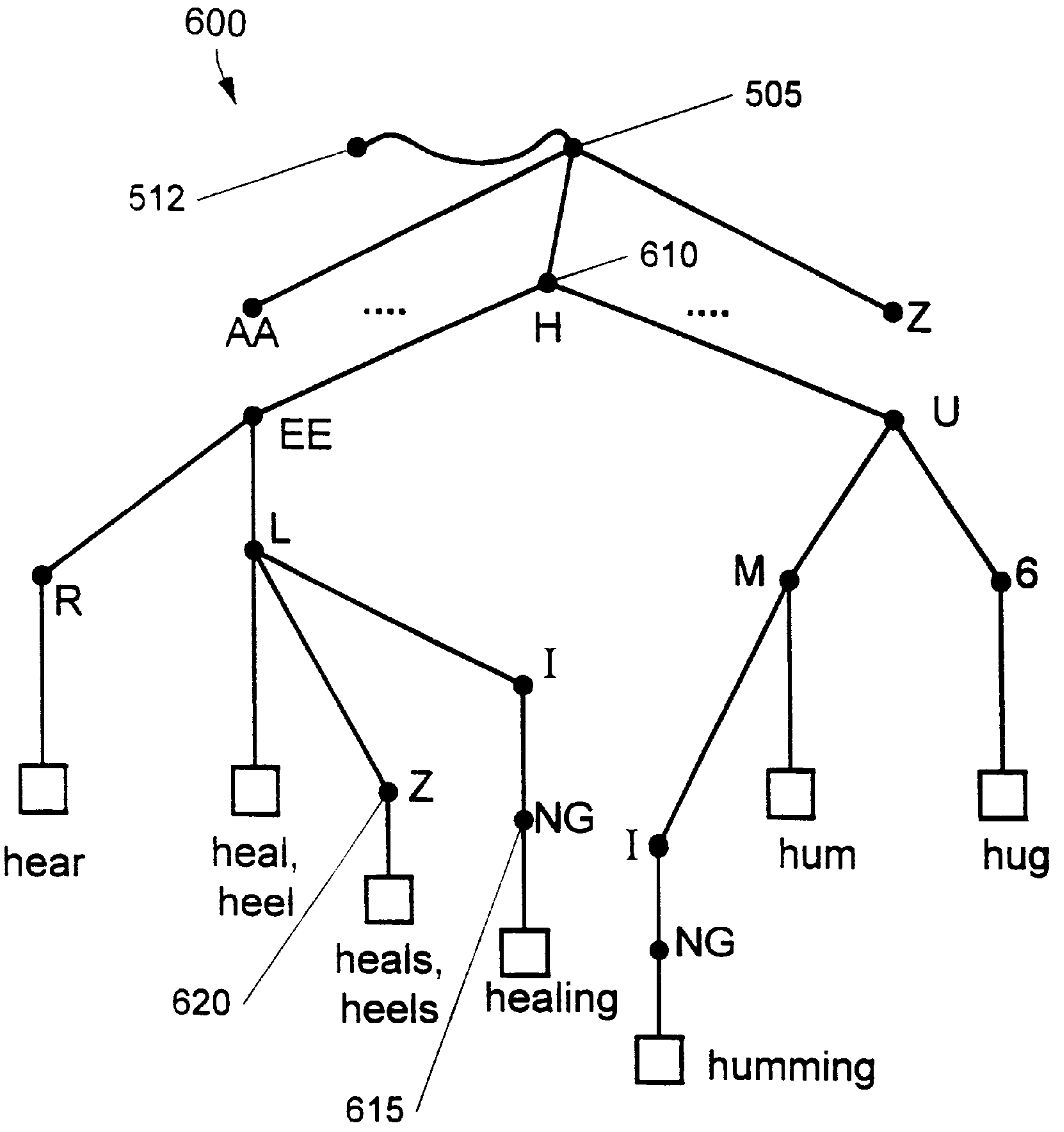
FIG. 6 is a graph of a portion of the lexical tree of FIG. 5.

Referring to FIGS. 5 and 6, the pre-filtering procedure 240 uses a lexical tree 500 that is initialized before processing begins. The lexical tree represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
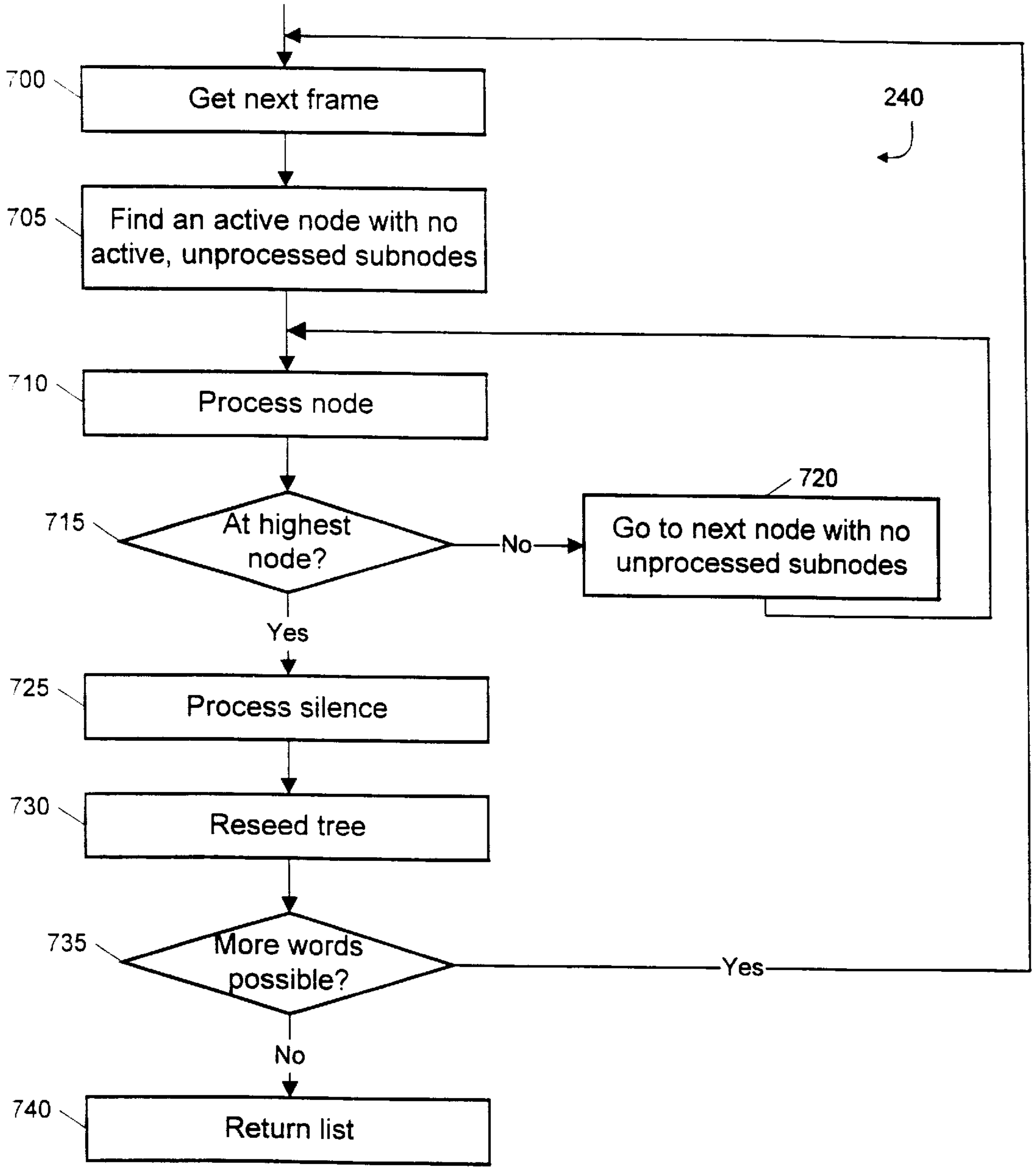
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 705). Successors of a node also may be referred to as subnodes of the node. When the lexical tree is initialized, the silence node 512 is the only active node.

Next, the pre-filtering procedure processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure determines whether the node is the highest node in the tree (i.e., the root node) (step 715). If the node is not the highest node, then the pre-filtering procedure goes to the next node having no unprocessed active subnodes (step 720) and processes that node (step 710). When searching for the next node to process, the pre-filtering procedure considers inactive nodes having active subnodes or active siblings.

If the processed node is the highest active node (step 715), then the pre-filtering procedure processes the silence node 512 (step 725). In general, the silence node is processed by comparing a frame to a model for silence and adding the resulting score to the minimum of the current score for the silence node and the score for the root node 505.

Next, the pre-filtering procedure reseeds the lexical tree (step 730). The pre-filtering procedure reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (i.e., a score having a value larger than a pruning threshold).

Next, the pre-filtering procedure determines whether more words may be added to the word list for the requested time (step 735). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 700) and repeats the steps discussed above.

If words cannot be added to the word list (step 735), then the pre-filtering procedure returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure also deletes any lists of words for times prior to the requested start time.

Figure 8A:
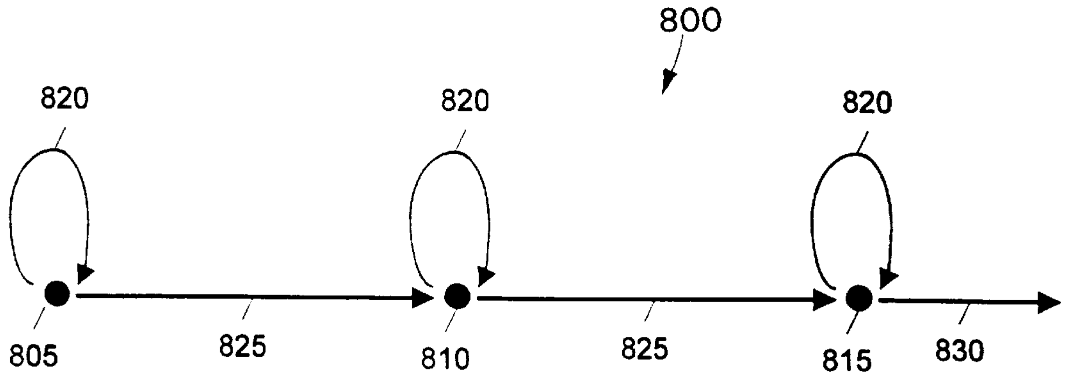
FIGS. 8A, 8B and 8C are state graphs representing nodes of the lexical tree of FIG. 5.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Figure 8B:
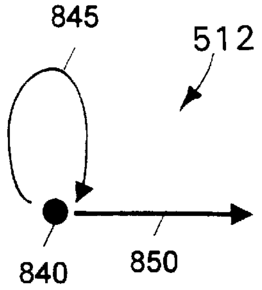

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Figure 8C:
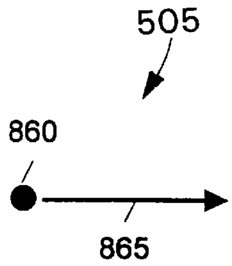

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (i.e., the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (i.e., the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree. Before the first frame is retrieved (row 900), state 840 (which corresponds to silence) has a score of 0 and no other nodes are active. The score of 0 means that there is a one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (i.e., the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal the time associated with the first frame. This value for the starting time indicates that the score at state 805 represents a word that started at a time corresponding to the first frame. The starting time moves with the score as the score propagates through the lexical tree.

After the second frame is retrieved (row 910), the score for the state 840 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 840 ($S_{A2}$) equals the likelihood that both of the first and second frames correspond to silence. This process is repeated for subsequent frames (e.g., lines 915 and 920) so that the score for the state 840 at a frame "n" ($S_{An}$) equals:

$$S_{An}=S_{An-1}+A_{An}=\sum_{m=1}^{n}A_{Am}.$$

This expression assumes that the silence node 512 is not reseeded from the root node 505. If reseeding occurs at a frame n, then the value of $S_{An-1}$ would be replaced by the score in the root node 505 for the frame n−1.

After the second frame is retrieved, the score for the state 805 ($S_{B2}$) is set equal to:

$$S_{B2}=\min(S_{B1}+stay_B,\ S_{A1})+A_{B2},$$

where $A_{B2}$ is the acoustic score resulting from an acoustic match of the second frame with the acoustic model corresponding to state 805 and $stay_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. When the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+leave_B+A_{C2},$$

where $A_{C2}$ is the acoustic score resulting from an acoustic match of the second frame with the acoustic model corresponding to state 810 and $leave_B$ is the leaving penalty for the state 805. Similarly, leaves and $leave_D$ are leaving penalties for, respectively, states 810 and 815. The sum of language model components of $leave_B$, $leave_C$ and $leave_D$ represents the language model score for the phoneme represented by the node 800.

The methodology for determining state scores for states other than the silence state can be expressed more generally as:

$$S_{i,j}=\min\ (S_{i,j-1}+stay_i,\ S_{i-1,j-1}+leave_{j-1})+A_{i,j}.$$

for i greater than zero (where i equals zero corresponds to silence), and with the boundary condition that the score for an inactive state equals infinity or some sufficiently large value. The starting time for the state may be represented as:

$$t_{i,j}=t_{i,j-i} \text{ for } S_{i,j-1}+stay_i \leqq Si-1,j-1+leave_{j-1},$$

or $$t_{i,j}=t_{i-1,j-1} \text{ for } S_{i,j-1}+stay_i > Si-1,j-1+leave_{j-1},$$

for i and j greater than zero and with the boundary condition that the time value for a newly active state represents the frame at which the state became active. As previously noted, state scores for the silence state may be determined as:

$$S_{0,j}=S_{0,j-1}+A_{0,j}=\sum_{m=1}^{j} A_{0,m}.$$

with the boundary condition that $S_{0,0}$ equals zero. An even more general form, in which the scores are expressed as functions of the various parameters, is illustrated in FIG. 10.

Figure 11:
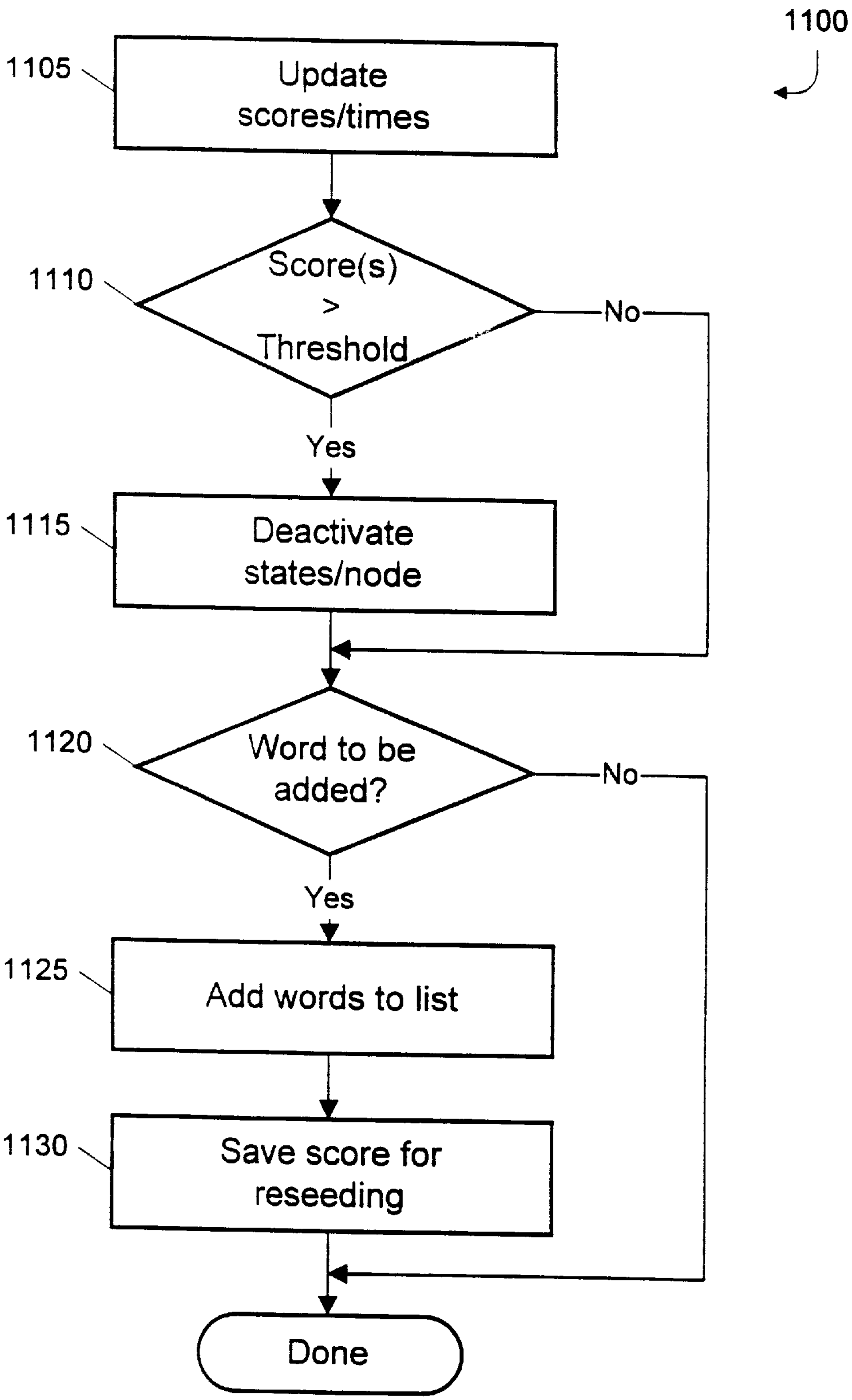
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores and using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 1125). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 215 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 1125), the node-processing procedure saves the score associated with the word as a reseeding score for use in reseeding the tree (step 1130). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The pre-filtering procedure reseeds the tree (step 730 of FIG. 7) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

$$S_{RS}=\min(S_w,\ S_{RS}')$$

Saving only the lowest score (i.e., the score indicating the highest probability that the current frame was the last frame of a word) ensures that the tree will be reseeded using the highest probability that the next frame is the first frame of a new word.

To reseed the tree (step 730 of FIG. 7), the pre-filtering procedure activates the root node 505 and associates the minimum of the reseeding score (SRS) and the score for the silence node 512 with the root node. During processing of the next frame, the active root node 505 may be used to activate nodes in the group 510 or to activate the silence node 512.

Processing of the node is complete after the node-processing procedure saves a score for use in reseeding the tree (step 1130), or if no word is to be added to the list of words (step 1120). The lexical tree pre-filtering procedure is discussed in detail in U.S. patent application No. 08/701, 393, filed on Aug. 22, 1996 and entitled "LEXICAL TREE PRE-FILTERING IN SPEECH RECOGNITION", which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypotheses for each word on the list, where the new hypothesis includes the words of the old hypothesis plus the new word.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate anvle hypothesis that is associated with a constraint grammar (e.g., a command hypothesis), but does not comply with the constraint grammar.

Figure 12:
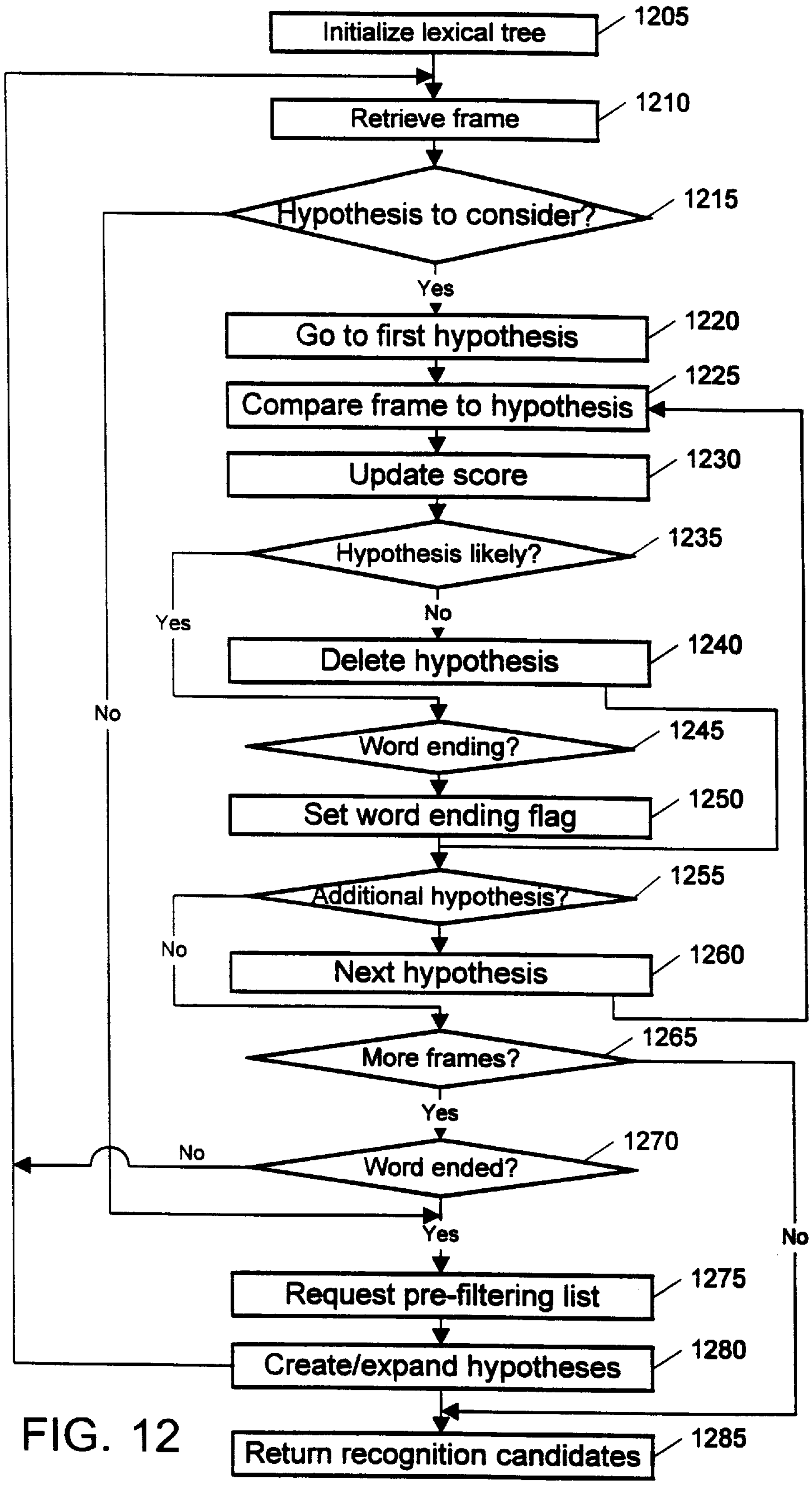
FIG. 12 is a flow chart of a speech recognition procedure.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), then the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best scoring node for the current frame or for one or more of a predetermined number of immediately preceding frames must have been a node other than the silence node (i.e., the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand any hypothesis for which a word has ended (step 1280). Each word in the list of words has an associated score. Prior to adding a list word to a hypothesis, the recognizer modifies the list score ($S_L$) for the word to produce a modified list score ($SM_L$) as:

$$S_{ML}=S_L+L_CL_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 215 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. The control/interface module controls operation of the speech recognition software in response to speech recognition commands (e.g., "wake up", "make that"), and forwards external commands to the appropriate software.

The control/interface module also controls the active vocabulary, acoustic models, and constraint grammars that are used by the recognizer. For example, when the speech recognition software is being used in conjunction with a particular application (e.g., Microsoft Word), the control/interface module updates the active vocabulary to include command words associated with that application and activates constraint grammars associated with the application.

Other functions provided by the control/interface module include an enrollment program, a vocabulary customizer, and a vocabulary manager. The enrollment program collects acoustic information from a user and trains or adapts a user's models based on that information. The vocabulary customizer optimizes the language model of a specific topic by scanning user supplied text. The vocabulary manager is a developer tool which is used to browse and manipulate vocabularies, grammars and macros. Each function of the control/interface module 220 may be implemented as an executable program that is separate from the main speech recognition software.

A complete dictation vocabulary consists of the active vocabulary plus a backup vocabulary 245. The backup vocabulary may include files that contain user-specific backup vocabulary words and system-wide backup vocabulary words. User-specific backup vocabulary words include words which a user has created while using the speech recognition software (up to a limit of 64,000 words). These words are stored in vocabulary files for the user and for the dictation, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup dictionaries noted above, there is a system-wide backup dictionary. The system-wide backup dictionary contains all the words known to the system, including words which may currently be in an active vocabulary.

During error correction, word searches of the backup vocabularies start with the user-specific backup dictionary and then check the system-wide backup dictionary. The backup dictionaries also are searched when there are new words in text that a user has typed.

Figure 13:
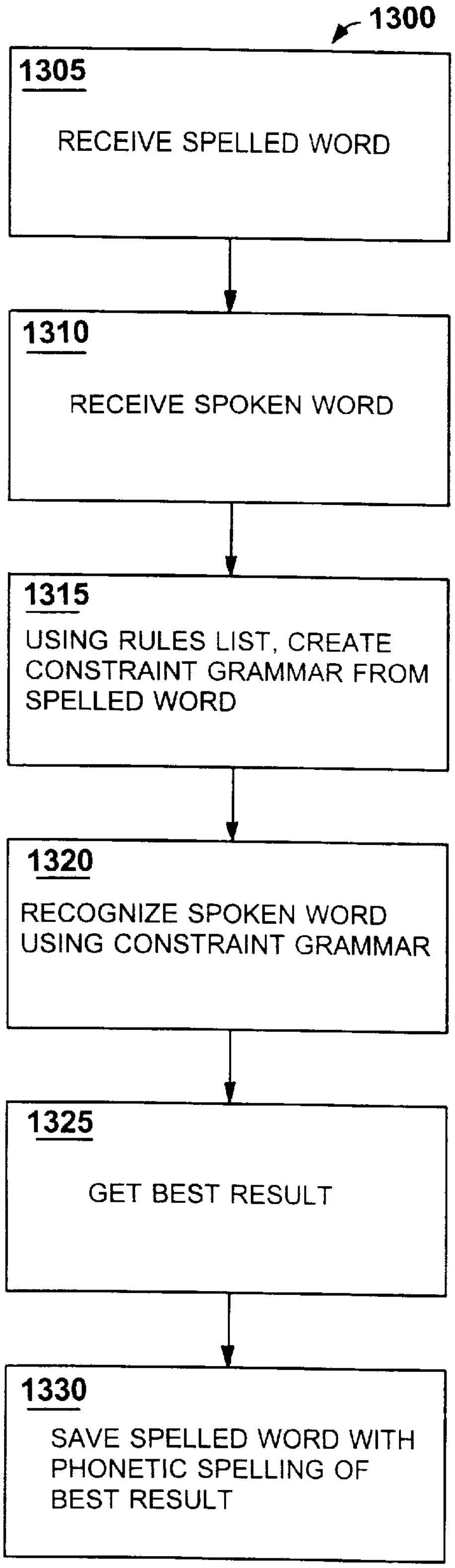
FIG. 13 is a flow chart of a procedure for adding a word to a dictation vocabulary.

Two methods of adding new, non-user-specific words to the dictation vocabulary will now be described. Referring to FIG. 13, in the first method 1300, to add a new word, the user types in the word (step 1305) and utters the word (step 1310). Using a rules list that contains possible phonemes associated with letters and strings of letters, and their associated probabilities (frequencies of occurrence in the vocabulary), a constraint grammar containing a word list of possible phonetic spellings is created from the spelled word (step 1315). An example of a rules list is provided in Appendix A. A table relating the phoneme symbols in Appendix A to human pronunciations is included as FIG. 20., Recognizer 215 is then used to choose the best phonetic spelling from the constraint grammar by recognizing the spoken word against the constraint grammar (steps 1320 and 1325). The spelled word with the phonetic spelling of the best result is then added to the dictionary (step 1330).

Figure 14:
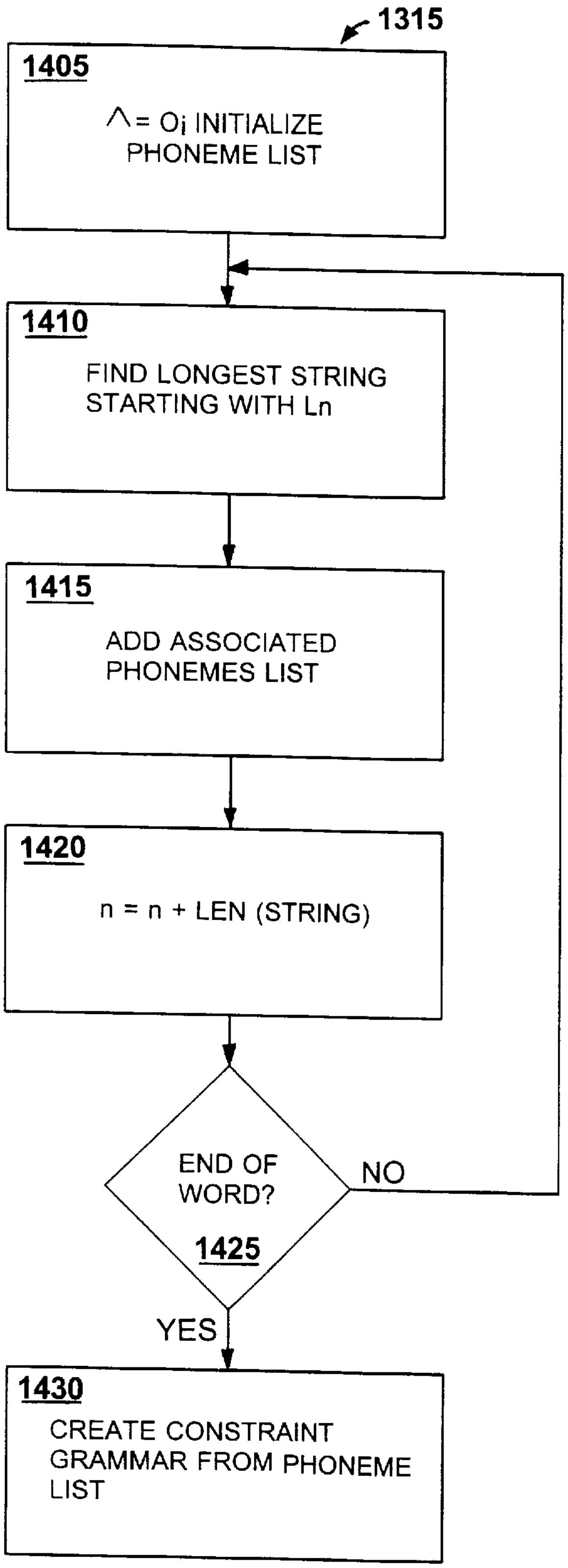
FIG. 14 is a flow chart of a procedure for using a rules list to create a constraint grammar from a spelled word.

FIG. 14 shows a method for creating the constraint grammar (step 1315). After the user spells and utters the new word, a letter counter, n, is initialized to zero so as to point to the first letter of the spelled word (step 1405). The longest string of spelled letters starting with the letter in the nth place is then found in the rules list (step 1410).

For example, if the new word is "weight", "w" is in the zero place and the longest string of letters in the rules starting with "w" is "w" (i.e., "we", "wei", etc. are not in the rules list.) The possible phonemes for "w", there being four in the rules list, with their associated probabilities, expressed as negative logarithm probabilities, are then stored in a phoneme list (step 1415).

The phoneme list for n=0 and letter string "w" can be expressed as:

| phoneme | probability |
|---|---|
| d@bLyH | 100 |
| hw | 670 |
| v | 780 |
| w | 1 |

Letter counter n is then incremented with its new value equal to its old value plus the length of the letter string in step 1410 (step 1420). The value of letter counter n is checked against the length of the spelled word to see if the end of the word has been reached (step 1425). If the end of the word has not been reached, the longest string of spelled letters in the rules list starting with the letter in the nth place is found (step 1410). In the example, n is incremented to one, and the longest string of spelled letters in the rules list starting with "e", the letter in the first place, is found. The longest letter string is "eigh". The possible phonemes for "eigh", there being two in the rules list, are then stored in the phoneme list with their associated probabilities.

The phoneme list for n=1 and letter string "eigh" can be expressed as:

| phoneme | probability |
|---|---|
| $ | 9 |
| B | 239 |

Letter counter n is then incremented by the length of the letter string "eigh", i.e., n=1+4. The longest string of spelled letters starting with "t" is t (there being no spelled letters after t). The possible phonemes for "t", there being three in the rules list, are then stored in the phoneme list with their associated probabilities.

The phoneme list for n=5 and letter string "t" can be expressed as:

| phoneme | probability |
|---|---|
| d | 897 |
| t | 1 |
| t/ | 100 |

When the end of the word has been reached, the constraint grammar is created by forming the complete phonetic spellings of the spelled word from the phonetic fragments in the phoneme list and adding the associated probabilities (step 1430).

| word | probability |
|---|---|
| w$t | 11 |
| w$t/ | 110 |
| d@bLyH$t | 110 |
| d@bLyH$t/ | 209 |
| w8t | 241 |
| d@bLyH8t | 340 |
| w8t/ | 340 |
| d@bLyH8t/ | 439 |
| etc. | |

The constraint grammar is restricted to the 200 phonetic spellings having the highest probabilities (the lowest −log values). Recognizer 215 is then used to recognize the uttered word against the constraint grammar and to select the best phonetic spelling of the spoken word.

Figure 15:
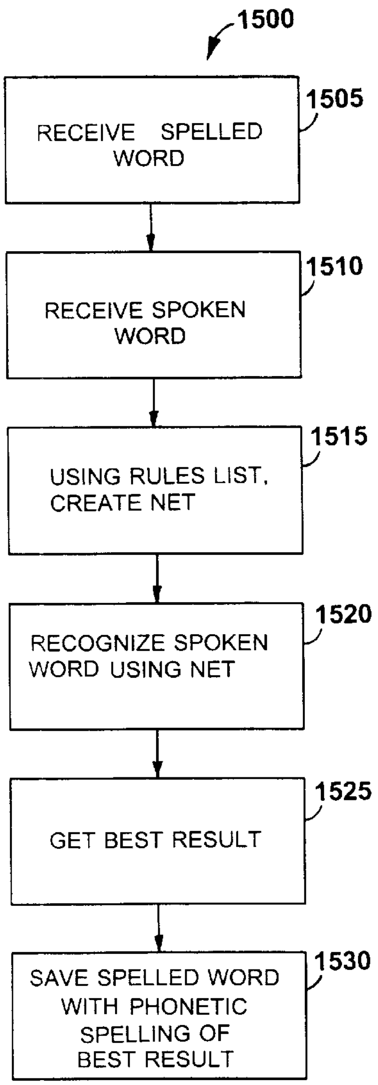
FIG. 15 is a flow chart of another procedure for adding a word to a dictation vocabulary.

Referring to FIG. 15, in the second method 1500 of adding new words to the vocabulary, after the user spells the word (step 1505) and utters the word (step 1510), a rules list is used to create a net containing all possible phonetic spellings of the spelled word (step 1515). See L. Bahl et al., "A Maximum Likelihood Approach to Continuous Speech Recognition," *IEEE Transactions on Pattern Analysis and Machine Intelligence*, Vol. PAMI-5, No.2, March 1983, pp. 179–190, which is incorporated by reference, for a general description of net formation. An example of a rules list for use with this method is provided in Appendix B.

Figure 16:
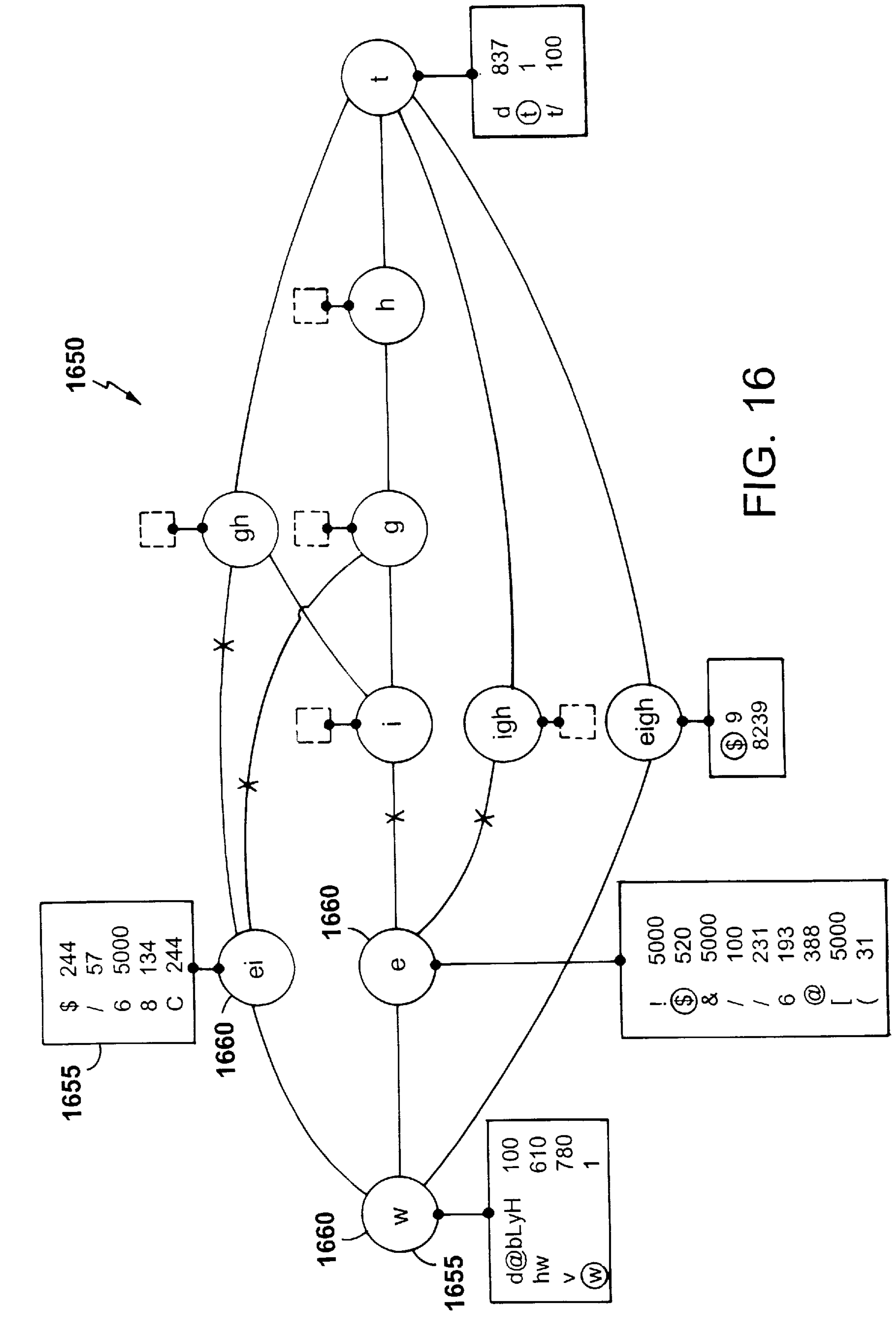
FIG. 16 is an illustration of a net created from a spelled word.

FIG. 16 shows an example of a net 1650 created for the word "weight". The rules list provides a list of phonemes 1655 associated with each letter node 1660 of net 1650. Recognizer 215 uses continuous recognition of the uttered word to prune out the paths of net 1650 that do not contain phonemes corresponding to the spoken word to choose the best phonetic spelling (steps 1520 and 1525). The spelled word with the phonetic spelling of the best result is then added to the dictionary (step 1530). In the example of FIG. 16, the paths leading to "gh", "i" and "igh" are pruned out by the recognizer, and "w$t" is selected by the recognizer. If the acoustic match of the appropriate section of the spoken word to the phonemes 1655 does not result in a strong distinction between possible phonemes 1655, the recognizer will select the phoneme having the higher associated probability.

The phonemes in the rules list of Appendix B can also be used to perform phoneme recognition. Concurrently with using the net, or as a back-off procedure if no match is found using the net, continuous recognition of the uttered word against all of the phonemes in the rules list can be performed. This is particularly effective in cases such as "FIG. " pronounced "figure", where the word is abbreviated and the period symbol is not pronounced.

Figure 17:
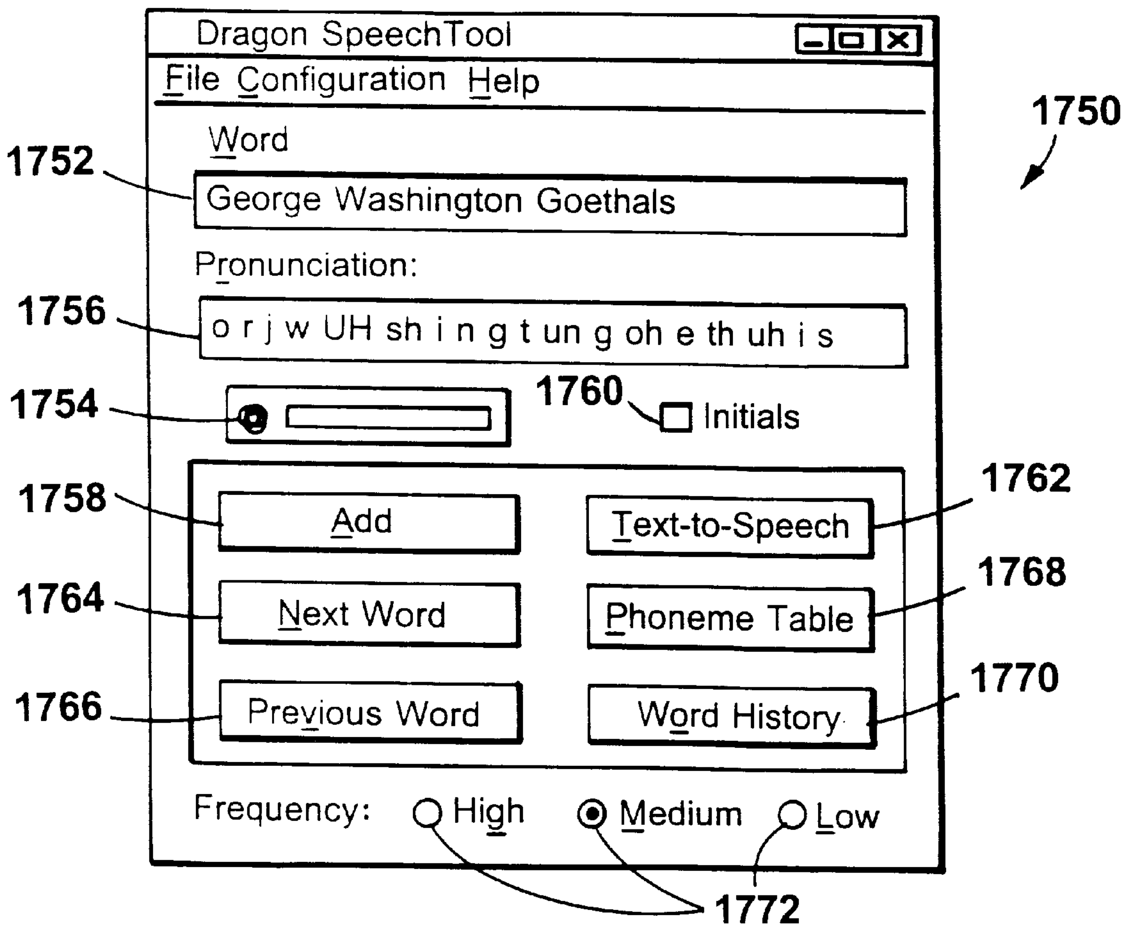
FIG. 17 is an illustration of a user interface for use when adding a word to a dictation vocabulary.

Referring to FIG. 17, to add a new word, the user interfaces with a control window 1750. The word is typed into box 1752, and the users utters the word after turning a microphone on using microphone button 1754. The pronunciation of the word determined by either of the methods described above then appears in the pronunciation box 1756. The user can edit the pronunciation in box 1756 or directly type the pronunciation into box 1756.

Figure 18:
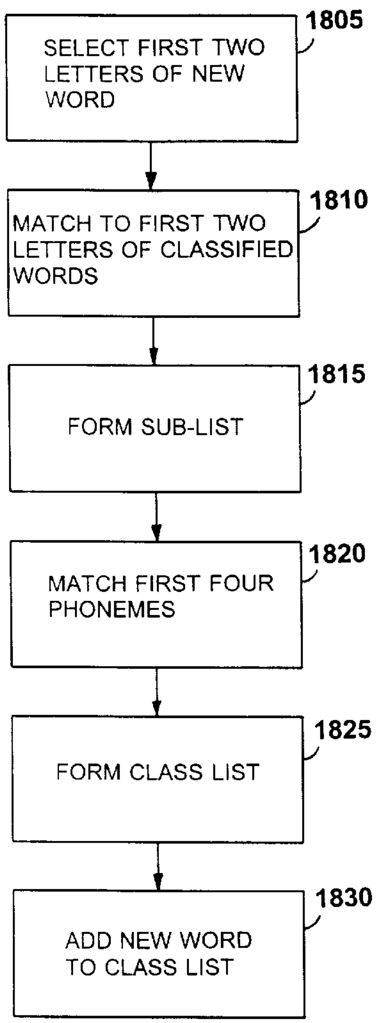
FIG. 18 is a flow chart of a procedure for adding a word to a pre-filter class.

Once the phonetic spelling has been generated it needs to be added to the dictionary. The add button 1758 adds the word to the vocabulary and places the word in a pre-filter class. The new word is assigned a pre-filter class by comparing the new word to words already classified. Referring to FIG. 18, the first two letters of the new word are selected (step 1805) and matched to classified words starting with the same two letters (step 1810) to form a sub-list of classified words (step 1815). For example, if the new word is "hyperbole", a sub-list of classified words is formed that start with "hy". The first four phonemes of the new word are then matched against the first four phonemes of the words in the sub-list (step 1820) to form a class list (step 1825). In the example, the first four phonemes are "h ai p r". The class list contains all classified words in the sub-list that begin with these four phonemes. Words such as "hypertension" are included in the class list. The new word is placed in the class list (step 1830). If there is no match for the first four phonemes, an attempt is made to match the first three, two, or one phonemes, in that order. If no match is found, the search is done on the entire classified word list as a back-off.

Figure 19:
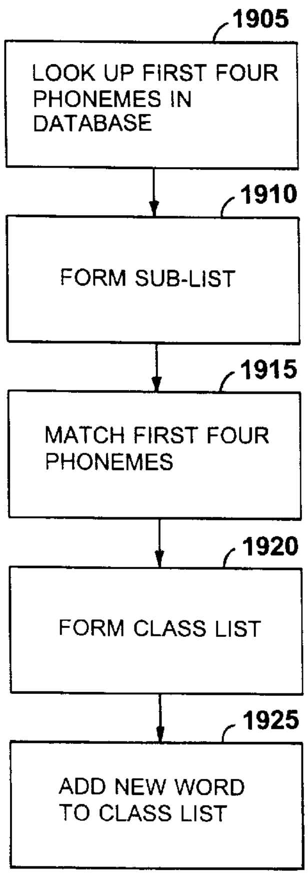
FIG. 19 is a flow chart of another procedure for adding a word to a pre-filter class.

Referring to FIG. 19, in a preferred, faster procedure for assigning a pre-filter class to a new word, a direct look-up is performed of the pronunciation of the new word against a database containing a list of all classified words placed in alphabetic order by their first four phonemes (step 1905). The direct look-up matches the first four phonemes of the new word to the first classified word in the list having the same first four phonemes, or a sub-set of the first four phonemes if there is no match. Starting with the first classified word that matches, that word, and the next 199 words in the list of classified words form the sub-list (step 1910). The first four phonemes of the new word are then matched against the first four phonemes of the words in the sub-list (step 1915) to form a class list (step 1920). The new word is placed in the class list (step 1925).

The initials box 1760 is used to indicate that the word being added is pronounced as a set of initials. Activating the text-to-speech button 1762 plays back the phonemes in pronunciation box 1756. A next word button 1764 is used if the user is adding words from input files; activating button 1764 displays the next word in the file in box 1752. Similarly, activating previous word button 1766 displays the previous word in the input file in box 1752. Activating a phoneme table button 68 opens a table containing valid phonemes. Pronunciation box 1756 can be edited using the phoneme table. Activating word history button 1770 displays the words in the current vocabulary and allows the user to delete a word, display all pronunciations for a word, add a pronunciation for a word, and delete a pronunciation for a word. Frequency buttons 1772 are used to specify the relative frequency with which the pronunciation in box 1756 is used.

Appendix C is the source code in C++, including header files, for the method of adding a word to the dictation vocabulary described in FIGS. 13 and 14. Appendix D is the source code in C++, including header files, for the method of adding a word to the dictation vocabulary described in FIGS. 16 and 17. The code in appendices C and D can be applied to languages other than English.

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of adding a word to a speech recognition vocabulary, comprising:

receiving a spelling of the word, receiving an utterance of the word, creating a collection of possible phonetic pronunciations of the word by:

comparing the spelling to a rules list of letter strings with associated phonemes, wherein the comparing includes searching the letter strings of the rules list for a letter string from the spelling of length greater than one letter, and limiting the collection of possible phonetic pronunciations to phonetic pronunciations containing phonemes associated with the letter string of length greater than one, using speech recognition to find a best-matching pronunciation from the collection that best matches the utterance of the word, and adding the word to the speech recognition vocabulary using the spelling and the best-matching pronunciation.

2. The method of claim 1 wherein said step of comparing includes searching the letter strings of the rules list for a longest length letter string from the spelling.

3. The method of claim 2 wherein said step of limiting includes limiting the collection of possible phonetic pronunciations to phonetic pronunciations containing phonemes associated with the letter string of longest length.

4. The method of claim 1 wherein the step of comparing includes starting the comparing with letter strings from the spelling beginning with a first letter of the spelling.

5. The method of claim 4 wherein the step of comparing includes searching the letter strings of the rules list for an initial longest length letter string from the spelling beginning with the first letter.

6. The method of claim 5 wherein the step of comparing includes searching the letter strings of the rules list for a subsequent longest length letter string from the spelling beginning with a letter following the last letter in the initial longest length letter string.

7. A method of adding a word to a speech recognition vocabulary, comprising:

receiving a spelling of the word, receiving an utterance of the word, creating a net of possible phonetic pronunciations of the word by comparing the spelling to a rules list of letter strings with associated phonemes, using speech recognition to find a best-matching pronunciation from the net that best matches the utterance of the word, and adding the word to the speech recognition vocabulary using the spelling and the best-matching pronunciation.

8. A method of assigning a pre-filtering class to a word when adding a word to a speech recognition dictionary, the method comprising:

matching first two letters of the word to classified words starting with the same two letters to form a sub-list of classified words, matching phonemes of the word to phonemes of the classified words in the sub-list to form a class list, and placing the word in the class list.

9. The method of claim 8 wherein the step of matching phonemes of the word to phonemes of the classified words includes matching the first four phonemes of the word to the first four phonemes of the classified words.

10. A method of assigning a pre-filtering class to a word when adding a word to a speech recognition dictionary, the comprising:

performing a direct look-up of a first phoneme of the word in a database of classified words organized alphabetically by their phonemes, matching the first phoneme of the word to a first word in the database having the same first phoneme, selecting the first word in the database having the same first phoneme and following words in the database to form a sub-list, matching the first phoneme of the word to the first phoneme of the classified words in the sub-list to form a class list, and placing the word in the class list.

11. The method of claim 10 wherein the step of matching the first phoneme of the word to a first word in the database having the same first phoneme includes matching the first four phonemes of the word to a first word in the database having the same first four phonemes.

12. The method of claim 11 wherein the step of selecting the first word in the database having the same first phoneme includes selecting the first word in the database having the same first four phonemes.

13. The method of claim 12 wherein the step of matching the first phoneme of the word to the first phoneme of the classified words in the sub-list includes matching the first four phonemes of the word to the first four phonemes of the classified words in the sub-list.

14. The method of claim 10 wherein the step of selecting includes selecting the first word in the database having the same first phoneme and 199 following words in the database to form the sub-list.

* * * * *

US006092044C1

(12) EX PARTE REEXAMINATION CERTIFICATE (7040th)

United States Patent

Baker et al.

(10) Number: US 6,092,044 C1

(45) Certificate Issued: Sep. 1, 2009

(54) PRONUNCIATION GENERATION IN SPEECH RECOGNITION

(75) Inventors: James K. Baker, West Newton, MA (US); Gregory J. Gadbois, Amesbury, MA (US); Charles E. Ingold, Bedford, MA (US); Joel W. Parke, Marlborough, MA (US); Stijn Van Even, Jamaica Plain, MA (US)

(73) Assignee: Nuance Communications, Inc., Burlington, MA (US)

Reexamination Request:

No. 90/008,338, Nov. 21, 2006

Reexamination Certificate for:

| | |
|---|---|
| Patent No.: | **6,092,044** |
| Issued: | **Jul. 18, 2000** |
| Appl. No.: | **08/825,141** |
| Filed: | **Mar. 28, 1997** |

(51) Int. Cl.

| | |
|---|---|
| ***G10L 15/00*** | (2006.01) |
| ***G10L 15/06*** | (2006.01) |

(52) U.S. Cl. ................................ 704/254; 704/E15.008

(58) Field of Classification Search .................. 704/251, 704/254, 255, 257, 270, 275

See application file for complete search history.

(56) References Cited

U.S. PATENT DOCUMENTS 5,909,666 A * 6/1999 Gould et al. ................ 704/251
5,920,836 A * 7/1999 Gould et al. ................ 704/251
6,092,043 A * 7/2000 Squires et al. .............. 704/251
6,101,468 A * 8/2000 Gould et al. ................ 704/251

FOREIGN PATENT DOCUMENTS

EP 0 562 138 9/1993

OTHER PUBLICATIONS

*Automatic Modeling for Adding New Words to a Large–Vocabulary Continuous Speech Recognition System,* by Asadi et al. ICASSP 1991.

*DECtalk, A Guide to Voice,* dated 1985, for the Digital Equipment Corporation speech synthesis product, DECtalk.

* cited by examiner

*Primary Examiner*—Majid A. Banankhah

(57) ABSTRACT

A method of adding a word to a speech recognition vocabulary includes creating a collection of possible phonetic pronunciations from a spelling of the word and using speech recognition to find a pronunciation from the collection that best matches an utterance of the word. The collection is created by comparing the spelling to a rules list of letter strings with associated phonemes. The list is searched for a letter string from the spelling of length greater than one letter. The collection is limited to phonetic pronunciations containing phonemes associated with the letter string of length greater than one. In another method, a net of possible phonetic pronunciations of the word is created from the spelling and speech recognition is used to find the pronunciation from the net that best matches the utterance of the word. The invention also features methods of assigning a pre-filtering class to a word.

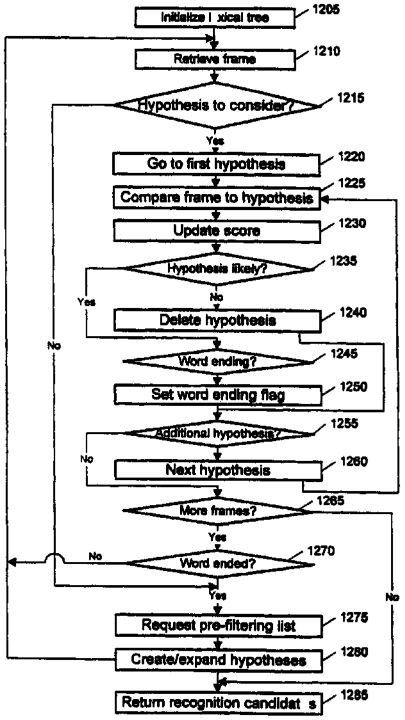

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–14 are cancelled.

New claims 15–21 are added and determined to be patentable.

*15. The method of claim 1 wherein the rules list of letter strings with associated phonemes comprises:*

*a plurality of letter strings, at least some of which comprise strings of more than one letter and less than a complete word, each of the letter strings being associated with one or more phonemes.*

*16. The method of claim 7 wherein the rules list of letter strings with associated phonemes comprises:*

*a plurality of letter strings, at least some of which comprise strings of more than one letter and less than a complete word, each of the letter strings being associated with one or more phonemes.*

*17. The method of claim 1 wherein:*

*the rules list further comprises probabilities associated with the phonemes as associated with the letter strings; and*

*limiting the collection of possible phonetic pronunciations further comprises limiting the collection of possible phonetic pronunciations according to the phonemes associated with the letter string of length greater than one and the probabilities associated with the phonemes.*

*18. The method of claim 7 wherein:*

*the rules list further comprises probabilities associated with the phonemes as associated with the letter strings.*

*19. The method of claim 7 wherein the net comprises a plurality of nodes, wherein a node represents a letter string from the spelling of the word that is less than the complete spelling of the word and phonemes associated with the letter string.*

*20. The method of claim 19 wherein:*

*the nodes comprise a start node representing a letter string that includes the first letter in the spelling of the word and an end node representing a letter string that includes the last letter in the spelling of the word, and*

*the net further comprises paths between nodes such that the letter strings represented by the nodes in a combination of nodes and paths including the start node and the end node and connecting the start node to the end node form the spelling of the word when combined according to the paths in the combination.*

*21. The method of claim 20 wherein using speech recognition comprises pruning paths of the net that do not contain phonemes corresponding to the utterance of the word.*

* * * * *